United States Patent [19]

Floyd et al.

[11] Patent Number: 4,695,606

[45] Date of Patent: Sep. 22, 1987

[54] COATING BINDER ADDITIVE

[75] Inventors: William C. Floyd, Chester; Sai H. Hui, Rock Hill, both of S.C.

[73] Assignee: Sun Chemical Corporation, New York, N.Y.

[21] Appl. No.: 909,621

[22] Filed: Sep. 22, 1986

[51] Int. Cl.⁴ .................... C08F 8/28; C08L 61/00
[52] U.S. Cl. ........................ 525/160; 525/154; 525/157; 525/161; 525/162; 525/163; 525/383
[58] Field of Search .............. 525/154, 383, 326.9, 525/515, 162, 160, 161, 163; 528/245; 162/168.3

[56] References Cited

U.S. PATENT DOCUMENTS

| | | | |
|---|---|---|---|
| Re. 30,259 | 4/1980 | Moriya et al. | 162/167 |
| 2,886,557 | 5/1959 | Talet | 525/154 |
| 3,549,568 | 12/1970 | Coscia et al. | 260/17.3 |
| 3,869,296 | 3/1975 | Kelly, Jr. et al. | 106/214 |
| 4,100,137 | 7/1978 | Lemieux et al. | 525/154 |
| 4,343,655 | 8/1982 | Dodd et al. | 106/214 |
| 4,544,609 | 10/1985 | Hui | 428/507 |

*Primary Examiner*—Theodore E. Pertilla
*Attorney, Agent, or Firm*—Mitchell D. Bittman

[57] ABSTRACT

A coating binder additive is prepared comprising a blocked glyoxal resin mixed with a vinyl or acrylic water soluble polymer which is reactive with free glyoxal.

11 Claims, No Drawings

COATING BINDER ADDITIVE

This invention relates to paper coating compositions. More particularly it relates to an additive which insolubilizes the binders in coatings for paper.

BACKGROUND OF THE INVENTION

Paper coating compostions are generally a fluid suspension of pigment, such as clay with or without titanium dioxide, calcium carbonate, or the like, in an aqueous medium which includes a binder such as starch, modified starch, styrene-butadiene copolymer, acrylic polymer, or protein to adhere the pigment to paper.

The hydrophilic nature of the binder requires the presence of an insolubilizing material which crosslinks the binder making it hydrophobic and thus improving the off-set characteristics of the surface of the coated paper. The most widely-used crosslinking materials are glyoxal resins and formaldehyde-donor agents such as melamine-formaldehyde, urea-melamine-formaldehyde, and partially or wholly methylated derivatives thereof.

Glyoxal is a highly reactive monomer which cures quickly and has excellent insolubilizing properties. As a result of this rapid crosslinking of glyoxal and binder, however, the viscosity of the coating composition increases so rapidly and is so great that the composition cannot be used. Frequently glyoxal-insolubilized coatings gel completely, particularly in high solids formulations. Gelling can also occur in moderate or low solids formulations if they are not used promptly. Thus in situations where it is required that the viscosity remain stable for many hours, for example when high-solids coatings are to be applied by blade coating techniques, a glyoxal system is unsuitable.

Melamine-formaldehyde resins do not build viscosity in the coating compositions, but they have the disadvantage of having an unpleasant odor and of releasing free formaldehyde. Curing with such resins involves the crosslinking of the binder molecule with the methylol or methylated methylol group of the melamine resin, usually in an acid or neutral coating, and full insolubilization of the binder takes place slowly over a period of several days. Free formaldehyde can be released either directly from the coating mixture or when the coating is cured on the drying machine. The presence of even less than one percent of free formaldehyde, based on the total weight of the product, is undesirable, not only because of its objectionable odor, but because it is an allergen and an irritant, causing severe reactions in the operators who manufacture the coatings and who treat and handle the coated paper.

Various compositions have been disclosed in the art as useful as insolubilizers. The use of the reaction product of urea and glyoxal as an insolubilizer is disclosed in U.S. Pat. No. 3,869,296. Treating agents formed by the reaction of ethylene urea with glyoxal are disclosed in Japanese publication No. 5 3044-567, but they too do not have satisfactory properties. The use of an acrylamide/glyoxal adduct was disclosed in U.S. Pat. No. 3,549,568 to improve the wet rub of paper coating compositions. U.S. Pat. No. 4,343,655 teaches the use of the alkylated products of the reaction of glyoxal and cyclic ureas as crosslinking resins for binders for paper coating compositions. U.S. Pat. No. Re. 30,259 discloses paper strengthening resins in which water soluble thermosetting polyvinylamide resins are reacted with glyoxal.

In particular, U.S. Pat. No. 4544609 discloses an insolubilizer which is useful as a binder for a paper coating compostion comprising the reaction product of polyacrylamide, glyoxal and cyclic urea. While this insolubilizer has been effective, due to its high viscosity gelling can occur in concentrates of the insolubilizer containing greater than 20-25% solids.

SUMMARY OF THE INVENTION

Briefly, the coating binder additive comprises a blocked glyoxal resin mixed with a vinyl or acrylic water soluble polymer which is reactive with free glyoxal. This additive is an excellent crosslinking resin for binders for paper coating compositions. It does not build viscosity as does free glyoxal; it does not contain or evolve free formaldehyde; it has insolubilizing effects similar to those of the previously known agents; and imparts strength to the binder and enhances various printing properties of the coated substrate.

DETAILED DESCRIPTION OF THE INVENTION

In accordance with the present invention a binder additive is prepared which is useful for insolubilizing and strengthening starch, protein and polyvinyl alcohol binders for paper coating compositions. The binder additive is prepared as follows: (1) an acrylic or vinyl polymer which is water soluble and which reacts with free (unblocked) glyoxal or glyoxal resin is prepared; and (2) the polymer is mixed with a blocked glyoxal resin, preferably the reaction product of glyoxal and a urea or a cyclic urea, to give the product of this invention.

The glyoxal resin component of this mixture is blocked to inhibit it from reacting with the other components of the paper coating composition prior to curing. Inhibiting the reactivity of the glyoxal resin allows a product to be formulated at higher solids and/or lower viscosity than otherwise possible with unblocked glyoxal resin. Further, by blocking the glyoxal resin, the reaction is delayed until the paper is cured. The curing process unblocks the glyoxal and resin allowing them to react with the binder and polymer resulting in a cross-linked binder with superior strength and improved printing properties. Using this invention, it is possible to prepare a paper coating with a high level of natural binder that performs as well as a coating with a high level of synthetic (latex) binder. With free (unblocked) glyoxal, the coating additive can be unstable resulting in thickening or gelling of the additive, or the coating may show unacceptably high viscosity or gelling over time.

Glyoxal readily reacts with binders such as starch, protein and polyvinyl alcohol and with polyacrylamide and other polymeric agents in a crosslinking reaction. Crosslinking causes the mixture of glyoxal resin and the binders and/or polymeric agents to thicken or gel. By suitably blocking the gloxal resin, it may be mixed with these binders and polymeric agents without reacting to any great degree. The reactivity can be controlled so that it occurs in a paper coating as it is being dried and cured. Furthermore, judicious choice of polymeric agent allows coating properties to be enhanced as the glyoxal resin reacts with binder and the polymer. Mixing a suitable polymeric agent with free (unblocked) glyoxal, or adding free glyoxal to a coating containing a suitable polymeric agent generally causes thickening or gelling due to premature reaction.

The glyoxal may be blocked by reaction with a blocking component becoming a blocked glyoxal resin. Suitable blocking components include urea, substituted ureas (such as dimethyl urea), various cyclic ureas such as ethylene urea, substituted ethylene ureas (such as 4,5-dihydroxyethylene urea), propylene urea, substituted propylene ureas (such as 4-hydroxy-5-methylpropylene urea), carbamates (such as isopropyl or methyl carbamate), glycols (such as ethylene glycol to make 2,3-dihydroxydioxane, or dipropylene glycol to make an oligomeric condensation product), polyols (i.e. containing at least three hydroxy groups such as glycerin, to make 2,3-dihydroxy-5-hydroxymethyl dioxane) as well as unalkylated or partially alkylated polymeric glyoxal derived glycols such as poly (N-1′,2-dihydroxyethyl-ethylene urea). Preferably, the blocking component is a urea or cyclic urea because the blocked glyoxal resins formed are very stable providing long shelf life.

The reaction of the glyoxal and the blocking component, preferably a urea or cyclic urea, generally takes place within the temperature range of about 25° to 100° C., and preferably about 40° to 80° C. In general the pH of the reactants and resultant binder additive is about 2.5 to 8.0 and preferably is about 4 to 6.5

The urea reactant may be urea, monourein or the like. If a cyclic urea is selected it may have one of the following general formulas:

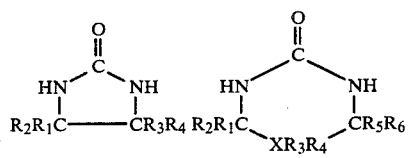

wherein $R_1$, $R_2$, $R_3$, $R_4$, $R_5$ and $R_6$ may be the same or different and each may be H, OH, COOH, R, OR, or COOR wherein R is an alkyl or a substitued alkyl group having 1 to 4 carbon atoms and X may be C, O, or N; when X is O, $R_3$ and $R_4$ are each zero; when X is N, $R_3$ or $R_4$ is zero.

Typical examples of such urea reactant compounds include, but are not limited to ethylene urea, propylene urea, uron, tetrohydro-5(2 hydroxyethyl)-1,3,5-triazin-2-one, 4,5-dihydroxy-2-imidazolidinone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, 4-hydroxy-5,5-dimethyl-pyrimid-2-one, and the like, and mixtures thereof.

A polymer is chosen which is water soluble and which will react with free (unblocked) glyoxal and glyoxal resin. Since the polymer is mixed with a blocked glyoxal resin in the binder additive, the polymer will react under curing conditions with the released glyoxal and resin resulting in crosslinking between the polymer, glyoxal, resin and binder (e.g. starch) which will strengthen the binder considerably. Since the polymer does not react with the crosslinker until curing of the coating composition, the binder additive and coating composition can maintain a low viscosity without gelling over time (i.e. storage stable). In addition, since the polymer has not been reacted with the glyoxal resin, the reactivity of the glyoxal resin can be maintained for subsequent curing with the binder. Further, the hydrophilic nature of the polymer results in a coating which can hold moisture and can benefit subsequent printing of the coated substrate.

Preferably a low molecular weight polymer is prepared with the molecular weight being controlled by, for example, using an alcohol such as isopropanol as a chain terminator, using a low concentration of acrylamide monomer, or using a low monomer concentration per unit time (using monomer feed instead of bulk). The preferred molecular weight is less than 100,000 daltons, optimally less than 30,000 daltons, which helps provide a binder additive and coating composition with a low viscosity and which does not gel.

Suitable polymers include polymers of monomers such as acrylamide, 2-hydroxyethyl acrylate, methacrylamide, N-(hydroxymethyl) acrylamide, N-substituted acrylamides and N-substituted methacrylalmides, as well as co- or ter polymers of the above with monomers such as acrylic acid, acrylonitrile, crotonic acid, fumaric acid, itaconic acid, maleic acid, methacrylic acid, monoethyl maleate, vinyl pyrolidone, or vinyl sulfonic acid. The monomers may also be with small amounts of vinyl acetate or C-1 to C-4 alkyl esters of acrylic or methacrylic acid. One preferred embodiment is a copolymer of acrylamide and methacrylic acid. Another preferred embodiment is a polymer containing acrylamide reacted with either formaldehyde, acetaldehyde, propionaldehyde, butyraldehyde or isobutyraldehyde. The polymer may also be partially hydrolyzed polyvinyl acetate.

In the binder additive the ingredients are generally present in a ratio of 25:1 to 1:2, preferably 10:1 to 1:1, parts by dry weight of the blocked glyoxal resin to polymer. The blocked glyoxal resin generally comprises a mole ratio of about 4:1 to 1:2, preferably 2:1 to 1:1, of glyoxal to blocking component.

The binder additive of this invention has reactive sites capable of reacting with the cellulosic hydroxyl group, thus binding the starch or protein molecules in the coating composition. Because of its polymeric nature, the additive is capable of reacting with several binder molecules, leading to greater insolublilizing efficiency and so requiring less of the additive of this invention than of glyoxal or of a melamine-formaldehyde resin to accomplish the same degree of insolubilization. The additive is not excessively reactive, as is glyoxal, so no viscosity build-up takes place in the coating composition. Since there is no formaldehyde in the system, the problems found with free formaldehyde are avoided.

The binder additive of this invention is useful as an insolubilizer for natural binders. The binders used in the paper coating compositions of this invention include, but are not limited to, unmodified starch; oxidized starch; enzyme-converted starch; starches having functional groups such as hydroxyl, carboxyl, amido, and amino groups; proteins, such as casein; polyvinyl alcohol; and the like, and their mixtures. Through use of the binder additive, the coating composition containing natural binders are able to impart properties, such as gloss, strength, etc. which are closer to those imparted by latex binders, but at a fraction of the cost of latex binders.

The coating composition will generally contain pigments which may be clay with or without titanium dioxide and/or calcium carbonate, and the like, and mixtures thereof. In addition to the binder, the pigment material, and the additive described above, the paper coating composition may also include materials such as dispersants (e.g. sodium hexametaphosphate), lubricants (e.g. calcium stearate), defoamers (e.g. oil based emulsions or ethyl alcohol), preservatives, colored pigments, viscosity modifiers (e.g. carboxymethylcellulose), and the like, in conventional amounts, as well as a latex (e.g. a polymer such as a styrene-butadiene copolymer or acrylic polymer) which may be used as a binder in addition to the natural binders.

In the paper coating compositions described herein the amount of binder is based upon the amount of pigment with the ratio varying with the amount of bonding desired and with the adhesive characteristics of the particular binder employed. In general, the amount of binder is about 5 to 25 percent and preferably about 12 to 18 percent, based on the weight of the pigment. The amount of additive varies with the amount and properties of the binder and the amount of insolubilization desired. In general, the additive is added at about 1 to 10 percent, and preferably about 3 to 7 percent, based on the weight of the binder (solids or dry basis). The total solids content of the paper coating composition generally is within the range of about 40 to 70 percent, depending upon the method of application and the product requirements.

The coating composition of this invention can be applied to paper or paper-like substrates by any known and convenient means.

EXAMPLE I

A blocked glyoxal resin, identified herein as Resin A, was prepared by reacting glyoxal with cyclic urea (4-hydroxy-5-methylpyrimidone) as follows. A two-liter flask was equipped with a mechanical stirrer, thermometer and condenser. To the flask was charged propionaldehyde (95.5 g, 1.64 moles) and 50% aqueous formaldehyde (98.7 g, 1.64 moles). As this mixture was stirred, a solution of 98.7 g (1.64 moles) of urea in 86.6 g of water was added. The reaction exothermed to 55° C. and was held there for 3 hours, becoming milky white. Sulfuric acid (40%, 19.5 g) was added causing the reaction to exotherm to 85° C., passing through a thickened state before thinning out again. After 2 hours, the reaction was clear amber. The temperature was held at 85° C. for another two hours. The reaction was cooled to 45° C. and 456 g 3.1 moles) of 40% glyoxal was added. This was heated to 65°–70° C. for 1 hour and vacuum stripped to 50% solids. The pH was adjusted to 5.0 with caustic soda and solids adjusted to 45%. A clear, amber solution was obtained.

EXAMPLE II

A blocked glyoxal resin, identified herein as Resin B, was obtained by reacting glyoxal with ethylene urea as follows. A one-liter flask was fitted with a mechanical stirrer, thermometer and condenser. To this was charged 290 g (2.0 moles) of 40% glyoxal and 90 g (1.05 moles) of ethylene urea. This was stirred as the pH was adjusted to 4.0 to 5.0 with sodium bicarbonate. The reaction was heated to 50°–60° C. for 2 hours. The pH was then adjusted to 2.5 with 40% sulfuric acid and held at 50°–60° C. for 3 more hours. After cooling to 35° C., the pH was adjusted to 5.0 with 25% caustic soda. Solids were adjusted to 45% with 110 g of water. This was filtered to afford a clear, light yellow solution.

EXAMPLE III

A polymer, identified herein as Polymer A, was prepared by copolymerizing acrylamide and methacrylic acid as follows. A two-liter resin kettle was equipped with a mechanical stirrer, $N_2$ sparge, condenser, thermometer and two addition funnels. To the kettle was charged 280 g of water and 114 g of isopropanol. This mixture was heated to 70° C. and sparged with nitrogen. As the mixture was heating, 261 g of 50% acrylamide (1.84 moles), 10 g (0.11 moles) of methacrylic acid, and 279 g of deionized water were mixed together and charged to one funnel. To the other funnel was charged a mixture of 54 g of deionized water and 1.34 g of ammonium persulfate. The contents of the two funnels were added simultaneously over a 1.5 hour period. During this addition and for two hours thereafter the temperature was held as 70° C. The reaction mixture was then cooled to 30° C. and the pH adjusted from 4.2 to 5.5 with caustic soda. The polymer had a Brookfield viscosity of 60 cps with a #2 spindle at 50 rpm and 200 cps with #2 spindle at 100 rpm and had a solids level of 17.6% by weight.

EXAMPLE IV

A N-hydroxy propyl acrylamide polymer, identified herein as Polymer B, was prepared by reacting propionaldehyde with polyacrylamide as follows. A one-liter flask was fitted with a nitrogen sparge, mechanical stirrer, condenser and 2 addition funnels. To the flask was charged 599 g of deionized water and 12 g of isopropanol. This was sparged with nitrogen and heated to 70° C. To one addition funnel was charged 160 g of 50% acrylamide. To the other was charged a solution of 0.8 g of ammonium persulfate in 32 g of deionized water. The contents of the two funnels were added simultaneously over 1 hour. The reaction was held at 70° C. for another two hours, then cooled. The finished product had a Brookfield viscosity of 70 cps with a #2 spindle at 50 rpm and a solids level of 12% by weight.

A portion of this product (185.1 g) was placed in a 250 ml flask with a magnetic stirrer, pH probe and thermometer, then cooled to 15° C. The pH was adjusted to 10.0 with caustic soda solution. To this was added 3 g (approx. 20 mole % with respect to acrylamide) of propionaldehyde over a 10 minute period. The pH was maintained at 10.0 and held there for 1 hour. The pH was then adjusted to 6.0 with acetic acid.

EXAMPLE V

A mixture was made of 3 parts by weight of Resin A and 1 part by weight of Polymer A. Liquid chromatography showed that the product was a mixture and that the components had not reacted. A similar mixture was made of Resin B and Polymer A, and was also found to be a mixture.

EXAMPLE VI

Binder additives were prepared containing as a blocked glyoxal resin either Resin A or Resin B, mixed with one of the following polymers: a 1:1 copolymer of acrylamide and N-methylol acrylamide; and poly(N-methylol acrylamide). These binder additives when added to a coating composition all gave coatings that were superior (better wet rub, higher pick strength, better smoothness, more porosity, better gloss and brightness) to a control coating composition containing a conventional insolubilizer which comprised a cylic urea-glyoxal reaction product.

EXAMPLE VII

One part Polymer B was blended with 3 parts Resin B to give a binder additive with superior coating properties. Dry pick results were particularly impressive.

EXAMPLE VIII

Paper coatings compositions were prepared either as a high latex coating containing 4 parts starch (Penford Gum 280, hydroxyethylated corn starch) and 8 parts latex (Dow 620, styrene-butadiene copolymer) or as a high starch coating containing 9 parts starch (Penford Gum 280) and 3 parts latex (Dow 620). Each coating composition also contained 50 parts No. 1 clay, 50 parts No. 2 clay and 0.15% Dispex N-40 (sodium polyacrylate dispersant). A binder additive was added where indicated at a level of 4% by weight of the starch. For comparison, certain coating samples used a commercial starch insolubilizer (Sunrez 700C, a cyclic urea-glyoxal reaction product blended with glyoxal and propylene glycol) as the additive. Paper was coated with a blade coater and tested as indicated below. The object was to produce a high starch coating that had properties similar to the high latex coating. The following coating samples 1-8 were high starch or high latex coatings containing the identified additive.

| Sample | 1 | 2 | 3 | 4 | 5 | 6 | 7 | 8 |
|---|---|---|---|---|---|---|---|---|
| Gloss | 64 | 63 | 56 | 58 | 57 | 54 | 68 | 55 |
| Smoothness | 26 | 22 | 31 | 23 | 24 | 20 | 18 | 30 |
| IGT Dry Pick | 84 | 84 | 62 | 66 | 72 | 68 | 77 | 65 |
| Wet rub, spec 20 | 85 | 90 | 51 | 55 | 68 | 76 | 83 | 55 |
| Brightness | 82 | 81 | 81 | 81 | 82 | 82 | 82 | 82 |
| Porosity | 15 | 20 | 35 | 33 | 38 | 25 | 23 | 38 |
| Crock (Rank) | 3 | 2 | 4 | 5 | 1 | 7 | 6 | 8 |
| Printed Gloss | 87 | 86 | 80 | 77 | 80 | 82 | 86 | 80 |

1 high latex, no additive;
2 high latex, with Sunrez 700C;
3 high starch, no additive;
4 high starch, with Sunrez 700C;
5 high starch, with Resin A;
6 high starch, with Resin B;
7 high starch, with Polymer A/Resin B mixture (1:6.75 by dry weight ratio); and
8 high starch, with Polymer A These results show that the binder additive of this invention containing a mixture of blocked glyoxal resin and polymer (Sample 7) gave a high starch paper coating with performance that closely matches that of the more expensive high latex coatings of Samples 1 and 2. It further shows that the addition to a high starch coating of the blocked glyoxal resin alone (Samples 4, 5 and 6) or polymer alone (Sample 8) does not give the performance of either a high starch coating containing the binder additive of this invention (Sample 7) or a high latex coating (Samples 1 and 2). The enhanced synergistic performance of the binder additive of this invention is an unexpected benefit. A coating product formulated with a binder additive containing a mixture of Resin A and Polymer A showed similar results to the binder additive containing the mixture of Polymer A and Resin B above.

EXAMPLE IX

A reaction product of polyacrylamide, glyoxal and urea was prepared as follows. To a 400 ml beaker was charged 121.5 g (0.84 moles) of 40% glyoxal and 18.0 g (0.21 moles) of ethylene urea. The pH was adjusted to 6.0 and allowed to stir one hour. The pH was then adjusted to 7.9, and 150 g of polyacrylamide (11% solids, RV viscosity, #1 spindle at 50 rpm is 66 cps) was added. This stirred one hour with pH dropping to 6.1. Propylene glycol (15.9 g) was added with 98g of water, reducing the solids to 32%. This reaction product compared with the Resin A/Polymer A blend of Example V (32% solids). The reaction product performed reasonably well when tested shortly after preparation; however, it gelled in less than one month. In contrast, the Resin A/Polymer A blend was still fluid after 6 weeks. The short shelf life of the reaction product is probably due to insufficiently blocked glyoxal.

EXAMPLE X

A reaction product, similar to those produced in U.S. Pat. No. 4,544,609, of polyacrylamide, glyoxal and urea was produced as follows. Polyacrylamide (150 g, 14% solids, 0.29 moles, RV viscosity #2 spindle at 50 rpm is 40 cps) and 17.7 g urea (0.29 moles) were mixed together and heated to 60° C. The pH was 4.7. Over a one hour period, 128 g (0.88 moles) of 40% glyoxal was added, maintaining 60° C. After the glyoxal was added, the pH was adjusted to 4.0 and held at 60° C. for 3 hours. Solids were 30.6%. This reaction product also gelled in about 1 month.

What is claimed is:

1. An additive for binders for paper coating compositions which comprises:
a blocked glyoxal resin, which is the reaction product of a glyoxal and a blocking component, mixed with a vinyl or acrylic water soluble polymer which is reactive with free glyoxal, the amounts being within the ratio of 25:1 to 1:2 parts by dry weight of the blocked glyoxal resin to the polymer.

2. Additive of claim 1 wherein the blocking component is selected from the group consisting of urea, cylic urea, carbamate, glycol, polyol containing at least three hydroxy groups and unalkylated or partially alkylated polymeric glyoxal derived glycol.

3. Additive of claim 2 wherein the blocking component is a urea or cyclic urea.

4. Additive of claim 3 wherein the polymer has a molecular weight of less than 100,000 daltons.

5. Additive of claim 1 wherein the polymer is made from a monomer selected from the group consisting of acrylamide, 2-hydroxyethyl acrylate, methacrylamide, N-substituted acrylamide and N-substituted methacrylamide and co- and ter- polymers thereof.

6. Additive of claim 5 wherein the polymer is a copolymer of the monomer of claim 5 with a monomer selected from the group consisting of acrylic acid, acrylonitrile, crotonic acid, fumaric acid, itaconic acid, maleic acid, methacrylic acid, monoethyl maleate, vinyl pyrolidone, vinyl sulfonic acid, vinyl acetate, and C-1 to C-4 alkyl esters of acrylic or methacrylic acid.

7. Additive of claim 4 wherein the polymer is a copolymer of acrylamide and methacrylic acid.

8. Additive of claim 4 wherein the polymer contains acrylamide reacted with an aldehyde selected from the group consisting of formaldehyde, acetaldehyde, propionaldehyde, butyraldehyde and isobutyraldehyde.

9. Additive of claim 5 wherein the ratio of blocked glyoxal resin to polymer is within the range of 10:1 to 1:1 parts by dry weight.

10. Additive of claim 1 wherein mole ratio of glyoxal to blocking component is within the range of 4:1 to 1:2.

11. Additive of claim 3 wherein the mole ratio of glyoxal to blocking component is within the range of 2:1 to 1:1.

* * * * *